3,122,413
METHOD FOR PRODUCING TITANIUM
TRICHLORIDE
Richard H. Singleton, Indianapolis, Ind., assignor to National Research Corporation, Cambridge, Mass., a corporation of Massachusetts
No Drawing. Continuation of application Ser. No. 723,661, Mar. 25, 1958, which is a continuation of application Ser. No. 471,496, Nov. 26, 1954, now Patent No. 2,940,825, dated June 14, 1960. This application June 23, 1959, Ser. No. 822,206
1 Claim. (Cl. 23—87)

This invention relates to the production of titanium trichloride. A more specific aspect of this invention relates to the production of titanium trichloride in a pure, relatively stable crystalline form obtained by the reaction of titanium tetrachloride with titanium monoxide.

According to the present discovery, a method has been provided by which titanium trichloride can be prepared by reacting gaseous titanium tetrachloride with titanium monoxide at a temperature above about 800° C., and preferably above about 1000° C. The titanium trichloride, which is formed as a gas admixed with gaseous titanium tetrachloride, can be maintained in the gaseous phase and later utilized without prior separation from the tetrachloride, or it can be recovered from the gaseous mixture by cooling to a temperature below that at which the gases are saturated with respect to the titanium trichloride. Under these latter conditions, titanium trichloride can be produced in the form of large purple crystals possessing a high degree of purity and a relatively high resistance to the hydrolytic attack of water vapor.

The present reaction can be conveniently carried out by placing a quantity of the solid reactant, i.e., titanium monoxide, preferably in powdered or other finely divided form, in a tube heated by a furnace so that the solid reactant is raised to a temperature greater than about 800° C., and preferably between about 1000° C. and about 1500° C. The tube should extend through and beyond the hot zone of the furnace so that the after portion of the tube can be cooled, e.g., by radiation, to a temperature below about 500° C. Vaporized titanium tetrachloride is then introduced into the heated part of the tube where it comes into contact with the heated solids and reacts to form trichloride vapors. These vapors then condense in the cooler portion of the tube.

The reaction taking place may be represented by the following equation:

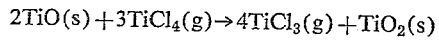

It has been discovered further that not all of the titanium tetrachloride reacts with the solid reactant, but that the gaseous product resulting from the reaction contains a relatively large proportion of titanium tetrachloride. The composition of product gases will depend both upon the particular solid reactant utilized and the temperature at which the reaction is carried out. For example, the reaction of titanium carbide with titanium tetrachloride will give a gaseous mixture of titanium tetrachloride and titanium trichloride having a trichloride concentration approximately as follows:

| Temperature, °C.: | Weight percent of TiCl₃ |
|---|---|
| 900 | 4.2 |
| 1000 | 6.4 |
| 1100 | 10.6 |
| 1200 | 15.3 |

Reaction of titanium tetrachloride with titanium monoxide under comparable conditions will give similar yields of titanium trichloride.

Recovery of solid crystalline titanium trichloride from the above-described mixture of titanium trichloride and titanium tetrachloride can be effected by gradually cooling the gaseous mixture to a temperature below that at which the gases are saturated with respect to titanium trichloride. When this cooling is carried out relatively slowly, the product titanium trichloride can be obtained in large crystalline form relatively resistant to attack by water vapor.

The temperature to which the gases must be cooled to recover crystalline titanium trichloride will depend upon the concentration of trichloride in the gaseous reaction product and upon the desired degree of recovery of trichloride. The vapor pressure of solid titanium trichloride varies with temperature approximately as follows:

| Temperature, °C.: | Vapor Pressure of TiCl₃, mm. Hg |
|---|---|
| 500 | 2 |
| 550 | 8 |
| 600 | 30 |
| 650 | 90 |

From the foregoing data it can be seen, for example, that the gases must be cooled to about 500° C. in order to reduce the concentration of titanium trichloride in the gases to about 6 mg. per liter.

In view of the foregoing, a preferred embodiment of the present invention is the reaction of titanium monoxide with titanium tetrachloride vapors at a temperature between about 1000° C. and about 1500° C., followed by gradual cooling of the gaseous reaction products to below about 650° C., and preferably below about 500° C., to precipitate solid titanium trichloride from the gaseous reaction products. A further preferred embodiment of the present invention comprises the cooling of the reaction mixture to a temperature below the dew point of the titanium tetrachloride, thereby forming a slurry of solid titanium trichloride in liquid titanium tetrachloride. This latter temperature will generally be below 136° C. (the normal boiling point of titanium tetrachloride). Recovery of the solid trichloride in this slurry form is particularly convenient for purposes of materials handling. The tetrachloride can be readily removed from the trichloride by evaporation, filtration, decantation, etc.

The solid titanium trichloride as produced by our process is suitable for disproportionation at elevated temperatures according to the reaction:

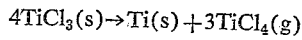

In this process, trichloride of high purity is a practical necessity since most of the impurities which might be present tend to concentrate in the metallic titanium produced. Impurities which normally result from the hydrolysis of the trichloride when exposed to water vapor or from the oxidation of the trichloride when exposed to air contain oxygen and are particularly undesirable in that they introduce oxygen into the metal, thereby making the metal very brittle. Since our process yields the trichloride in a dense crystalline form which is relatively stable in the presence of atmospheric moisture, it is particularly well suited for the production of metal by the above disproportionation process. The tetrachloride produced during the disporportionation reaction can be returned for reaction with more monoxide according to the process described herein.

For large scale operation the reaction of the present invention can be carried out in counter-current contacting apparatus such as a rotary kiln. The cooling of the reaction gases and consequent separation of titanium trichloride product may be carried out in a cooler portion of the reaction apparatus, or the gases may be directed into a separate condensing apparatus from which the titanium trichloride is removed as a dry crystalline solid or a slurry of solid trichloride in liquid titanium tetrachloride.

This application is a continuation of application Serial No. 723,661, filed March 25, 1958, now abandoned, which was in turn a continuation of application Serial No. 471,496, filed November 26, 1954, now U.S. Patent No. 2,940,825, issued June 14, 1960, which latter application discloses subject matter disclosed and claimed in my application Serial No. 315,461, filed October 18, 1952, now forfeited.

I claim:

A method for preparing titanium trichloride from titanium mono-oxide which comprises contacting in a reaction zone titanium mono-oxide with titanium tetrachloride in the vapor phase at a reaction temperature above about 800° C. to form titanium trichloride vapor and titanium dioxide, wherein the reactants consist essentially of said titanium tetrachloride and said titanium mono-oxide.

No references cited.